US012228497B2

(12) United States Patent
Souly et al.

(10) Patent No.: US 12,228,497 B2
(45) Date of Patent: Feb. 18, 2025

(54) DETERMINING MATERIAL PROPERTIES BASED ON MACHINE LEARNING MODELS

(71) Applicant: VOLKSWAGEN AKTIENGESELLSCHAFT, Wolfsburg (DE)

(72) Inventors: Nasim Souly, San Mateo, CA (US); Melanie Senn, Mountain View, CA (US); Gianina Alina Negoita, Belmont, CA (US)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 651 days.

(21) Appl. No.: 17/398,764

(22) Filed: Aug. 10, 2021

(65) Prior Publication Data

US 2023/0051237 A1 Feb. 16, 2023

(51) Int. Cl.
| | |
|---|---|
| G06T 7/00 | (2017.01) |
| G01N 21/17 | (2006.01) |
| G06N 3/08 | (2023.01) |

(52) U.S. Cl.
CPC .......... *G01N 21/17* (2013.01); *G06N 3/08* (2013.01); *G06T 7/0004* (2013.01); *G01N 2021/1765* (2013.01); *G06T 2207/10016* (2013.01); *G06T 2207/10056* (2013.01); *G06T 2207/20081* (2013.01); *G06T 2207/20084* (2013.01)

(58) Field of Classification Search
CPC ........... G06T 2207/20084; G06N 3/08; G01N 2021/1765
See application file for complete search history.

(56) References Cited

U.S. PATENT DOCUMENTS

| | | | | |
|---|---|---|---|---|
| 10,702,247 B2 * | 7/2020 | Hare, II | ................ | A61B 8/06 |
| 2023/0196629 A1 * | 6/2023 | Teskey | ................ | G06T 11/00 |
| | | | | 345/441 |

FOREIGN PATENT DOCUMENTS

WO WO-2021226614 A1 * 11/2021 ............. G01V 1/30

OTHER PUBLICATIONS

Petit, O., Thome, N., Rambour, C., Themyr, L., Collins, T., Soler, L. (2021). U-Net Transformer: Self and Cross Attention for Medical Image Segmentation. In: Lian, C., Cao, X., Rekik, I., Xu, X., Yan, P. (eds) Machine Learning in Medical Imaging. MLMI 2021. (Year: 2021).*

Klaus Kuchler, Daniel Westhoff, Julian Feinauer. Stochastic model for the 3D microstructure of pristine and cyclically aged cathodes in Li-ion batteries. Jan. 12, 2018. (Year: 2018).*

Touvron, Hugo, et al. "Training data-efficient image transformers & distillation through attention." International conference on machine learning. PMLR, 2021. (Year: 2021).*

(Continued)

*Primary Examiner* — John Villecco
*Assistant Examiner* — Alexander John Rodgers (57) ABSTRACT

In one embodiment, a method is provided. The method includes obtaining a sequence of images of a three-dimensional volume of a material. The method also includes determining a set of features based on the sequence of images and a first neural network. The set of features indicate microstructure features of the material. The method further includes determining a set of material properties of the three-dimensional volume of the material based on the set of features and a first transformer network.

18 Claims, 8 Drawing Sheets

(56) References Cited

OTHER PUBLICATIONS

Dosovitskiy, Alexey, et al. "An image is worth 16×16 words: Transformers for image recognition at scale." arXiv preprint arXiv:2010.11929 (2020). (Year: 2020).*

Bose, Rupak, Shivam Pande, and Biplab Banerjee. "Two headed dragons: Multimodal fusion and cross modal transactions." 2021 IEEE International Conference on Image Processing (ICIP). IEEE, 2021. (Year: 2021).*

* cited by examiner

DETERMINING MATERIAL PROPERTIES BASED ON MACHINE LEARNING MODELS

TECHNICAL FIELD

Aspects of the present disclosure relate to properties of material, and more particularly, to determine properties of materials based on machine learning models.

BACKGROUND

Various different materials (e.g., metals, alloys, polymers, ceramics, composites, etc.) can be used for various different purposes and/or applications. For example, a material may be used in a battery (e.g., an electric vehicle (EV) battery). All materials have a microstructure. The microstructure may be the small scale structure of a material. For example, the microstructure or a material may be the structure of a prepared surface of material as viewed by a microscope above a threshold magnification (e.g., at 25 times magnification or higher).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, all materials (e.g., metals, alloys, polymers, ceramics, composites, etc.) have a microstructure. Microstructure may be the small scale structure of a material. The microstructure of a material (such as metals, polymers, ceramics or composites) may influence and/or affect various properties of the material (e.g., physical properties, chemical properties, etc.). Such properties may include an amount of power that can be provided by the material, an amount of energy that can be stored by the material, specific power, specific energy, strength, toughness, corrosion resistance, high/low temperature behavior ductility, hardness, wear resistance, etc.

Analyzing the microstructure of a material to determine properties of a material is often a manual process performed by specialists/experts. Determining the properties of the material (based on microstructure analysis) may be a challenging and/or expensive process. Since the microstructure of a material be a combination of different phases or constituents with complex substructures, to identifying/determining its features and related properties may be very difficult.

The examples, implementations, and embodiments described herein may help address these issues, among others, when determining the properties of various materials (e.g., material properties). In one embodiment, a material analysis system may use images of the microstructure of a material to determine one or more properties of the material. The material science system may use machine learning models (e.g., neural networks) and/or transformer networks to analyze/process the images and determine the properties of the material. In some embodiments, the material analysis system may automatically determine the properties of the material based on the images of the microstructure.

In one embodiment, the material analysis system may simplify or streamline the process of determining the properties of a material. For example, rather than using a manual process performed by experts/specialists, the material analysis system may use images of the microstructure of the material to automatically determine or predict the properties of the material. The use of transformer networks (in the material analysis system) may also allow the material analysis system to pay attention to different portions of the sequential data and learn from the context of those portions of the sequential data, even when long or longer sequences of data are used. In addition, the use of transformer networks (in the material analysis system) may allow the material analysis system to determine the properties of the material more quickly and/or efficiently, because the operations, functions, actions, etc., of transformer networks can be parallelized (e.g., distributed among different processing devices, such as processors, graphical processing units (GPUs), processing cores, etc.) more easily.

Although the present disclosure may refer to certain properties of a material (e.g., power, energy, specific power, specific), the examples, implementations, aspects, and/or embodiments described herein may be used to determine other properties of a material. For example, the material analysis system may be used to determine the resistance to heat of a material. In another example, the material analysis system may be used to determine the brittleness of a material.

Figure 1:
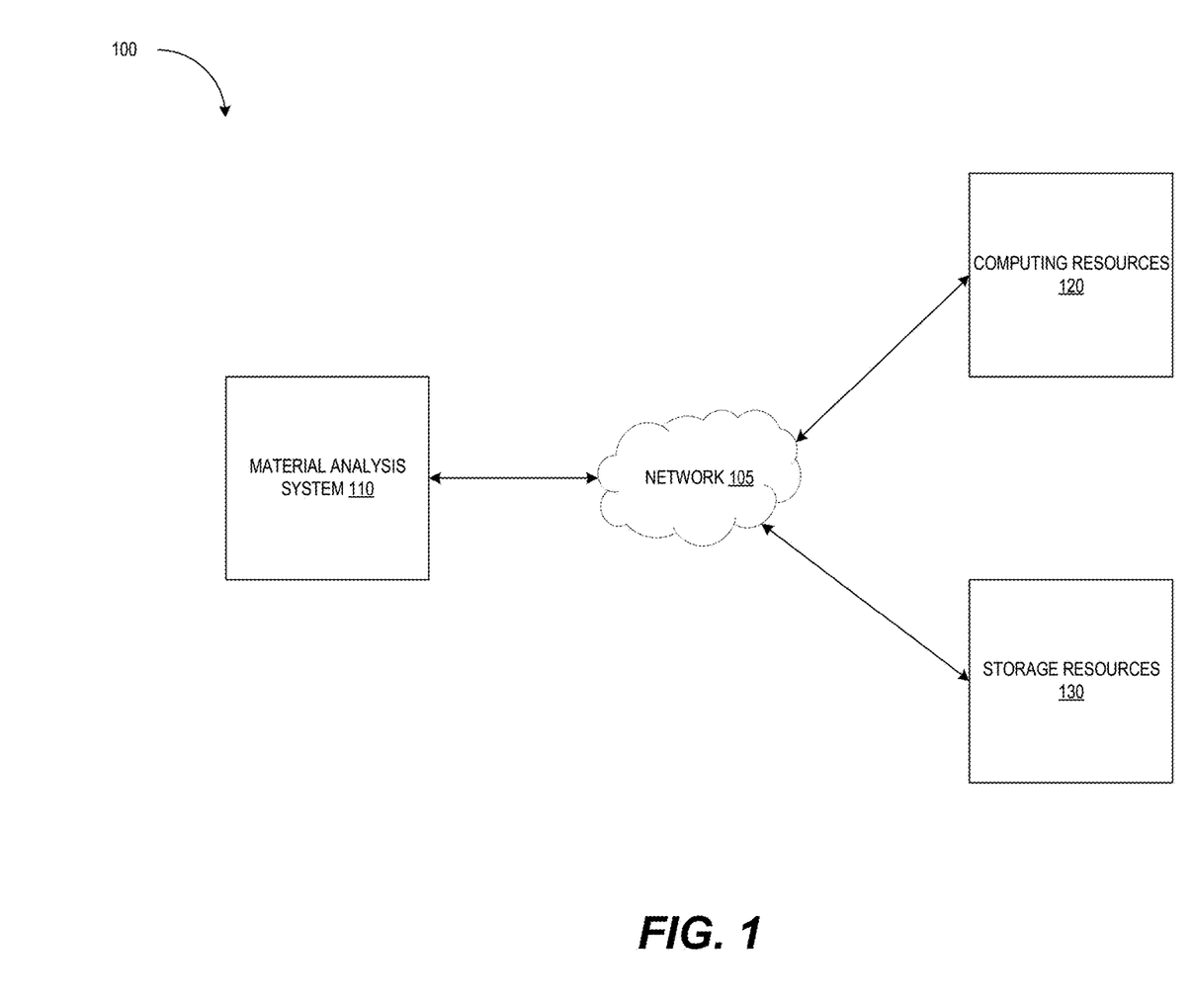
FIG. 1 is a block diagram that illustrates an example system architecture, in accordance with one or more embodiments of the present disclosure.

FIG. 1 is a block diagram that illustrates an example system architecture 100, in accordance with some embodiments of the present disclosure. The system architecture 100 includes network 105, a material analysis system 110, computing resources 120, and storage resources 130. Network 105 may interconnect the material analysis system 110, the computing resources 120, and/or the storage resources 130. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (Wi-Fi) hotspot connected with the network, a cellular system, and/or a wireless carrier system that can be implemented using various data processing equipment, communication towers (e.g. cell towers), etc. Network 105 may carry communications (e.g., data, message, packets, frames, etc.) between the material analysis system 110, the computing resources 120 and/or the storage resources 130.

The computing resources 120 may include computing devices which may include hardware such as processing devices (e.g., processors, central processing units (CPUs), processing cores, graphics processing units (GPUS)), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, rackmount servers, etc. In some examples, the computing devices may include a single machine or may include multiple interconnected machines (e.g., multiple servers configured in a cluster, cloud computing resources, etc.).

The computing resources 120 may also include virtual environments. In one embodiment, a virtual environment may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may present other software (i.e., "guest" software) the abstraction of one or more virtual machines (VMs) that provide the same or different abstractions to various guest software (e.g., guest operating system, guest applications). A VM may execute guest software that uses an underlying emulation of the physical resources (e.g., virtual processors and guest memory).

In another embodiment, a virtual environment may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. The container engine may also facilitate interactions between the container and the resources of the computing device. The container engine may also be used to create, remove, and manage containers.

The storage resources 130 may include various different types of storage devices, such as hard disk drives (HDDs), solid state drives (SSD), hybrid drives, storage area networks, storage arrays, etc. The storage resources 130 may also include cloud storage resources or platforms which allow for dynamic scaling of storage space.

Although the computing resources 120 and the storage resources 130 are illustrated separate from the material analysis system 110, one or more of the computing resources 120 and the storage resources 130 may be part of the material analysis system 110 in other embodiments. For example, the material analysis system 110 may include both the computing resources 120 and the storage resources 130.

As discussed above, determining the properties of the material (based on microstructure analysis) may be a challenging and/or expensive process that is often performed manually by experts/specialists. The examples, implementations, and embodiments described herein may help address these issues by determining the properties of various materials (e.g., material properties) based on images of the microstructure of the materials. The material analysis system 110 may use machine learning models (e.g., neural networks) and/or transformer networks to analyze/process the images and determine the properties of the material. The properties of the material may be determined automatically based on the images of the microstructure. The material analysis system 110 may simplify or streamline the process of determine the properties of a material. The material analysis system 110 may allow the material analysis system to determine the properties of the material more quickly and/or efficiently.

In one embodiment, the material analysis system 110 may obtain a set of images (e.g., one or more images, a sequence of images, etc.) of a three-dimensional (3D) volume of a material. For example, the set of images may depict portions of a cube (e.g., a 3D volume) of a material. The images may depict the structure and/or microstructure of the material. In one embodiment, the images of the structure/microstructure (of a material) may be generated using a simulation engine, simulation software, etc. For example, the images may be generated using a finite element analysis software/system. In another example, a machine learning model, such as a generative adversarial network (GAN) may be used to generate the images of the structure/microstructure (of a material) based on existing images of the structure/microstructure of an existing material. In another embodiment, the images of the structure/microstructure (of a material) may be obtained using a physical volume of the material. For example, the images of the volume of material may be captured by imaging devices such as microscopes, electron microscopes, etc. In one embodiment, the set of images may depict different cross-sections of the 3-D volume of material. For example, each image of the set or sequence of images may depict a cross-section of a cube of material at a particular depth. The depth of the cross-section of the cube of material may start from the top of the material (at the start of the set/sequence of images) to the bottom of the material (at the end of the set/sequence of images), or vice versa.

In one embodiment, the material analysis system 110 may determine, obtain, etc., a set of features based on the set of images and a machine learning model (e.g., a first machine learning model). The features may be visual features that are present or depicted in the images. The features may also indicate microstructure features of the material. For example, pores, crystalline structures, dendritic structures, beads, etc., may be microstructure features depicted in the images of material.

In one embodiment, the machine learning model may be a neural network. For example, the machine learning model may be a convolutional neural network (CNN) that receive the set of images as an input and determine, obtains, generate, etc., the set of features (e.g., visual features) as an output.

In one embodiment, the material analysis system 110 may determine a set of properties (e.g., one or more properties) of the material based on the set of features and a transformer network (e.g., a first transformer network). The set of properties may also be referred to as a set of material properties. The material analysis system 110 may determine the set of properties by providing the set of features to the transformer network as an input. The transformer network may process the set of features to determine, obtain, generate, etc., the set of properties (e.g., the transformer network may output the set of properties) of the material. Various different properties may be determined, obtained, etc., by the material analysis system. For example, the material analysis system 110 may determine an amount of power or energy the material may be able to store. In another example, the material analysis system 110 may determine an amount of power or energy the material may be able to discharge. In a further example, the material analysis system 110 may determine a specific energy of the material. In yet another example, the material analysis system 110 may determine a specific power of the material. Although the present disclosure may refer to certain properties of a material (e.g., power, energy, specific power, specific), the examples, implementations, aspects, and/or embodiments described herein may be used to determine other properties of a material (e.g., other physical and/or chemical properties).

In one embodiment, the material analysis system 110 may determine the set of features (based on the set or sequence of images) using multiple machine learning models (e.g., multiple neural networks, multiple CNNs, etc.). For example, the material analysis system 110 may include two CNNs, as discussed in more detail below. The set or sequence of images may be divided into subsets of images (e.g., sub-sequences of images, different groups of images, etc.). The different subsets of images may be provided to different machine learning models (e.g., different neural networks, different CNNs, etc.). Each of the machine learning models may generate a set of features based on the respective subset of images that was provided to the machine learning model. For example, a set of images may be divided into a first subset of images and a second subset of images. The first subset of image may be provided to a first CNN and a second subset of images may be provided to a second CNN. The first CNN may determine, generate, obtain, etc., a first set of features based on the first subset of images. The second CNN may determine, generate, obtain, etc., a second set of features based on the second subset of images.

In one embodiment, the material analysis system 110 may determine a set of transformer features based on multiple transformer networks and a set of features (e.g., a set of visual features determined or obtained by CNNs). For example, multiple CNNs may generate multiple sets of features. Each set of features (from a respective CNN) may be provided to a respective transformer network (e.g., one of multiple transformer networks). Each transformer network may determine a set of transformer features, based on the set of features obtained from the CNNs. For example, a first transformer network may receive a first set of features from a first CNN. The first transformer network may generate a first set of transformed features. A second transformer network may receive a second set of features from a second CNN. The second transformer network may generate a second set of transformed features.

In one embodiment, the material analysis system 110 may determine, generate, obtain, etc., one or more sets of properties of the material (e.g., one or more sets of material properties) based on the sets of transformed features generated by the transformer networks. As discussed above, each transformer network may generate a set of transformed features. Crossmodal attention data may be generated based on the sets of transformed features, as discussed in more detail below. For example, a first transformer network may generate a first set of transformed features and a second transformer network may generate a second set of transformed features. The material analysis system 110 may generate the crossmodal attention data based on the first and second set of transformed features.

In one embodiment, a set of crossmodal transformer networks (e.g., one or more crossmodal transform networks) may determine, obtain, generate, etc., the set of properties of the material (e.g., a set of material properties) based on the crossmodal attention data. For example, the set of crossmodal transformer networks may receive the crossmodal attention data as inputs and may determine, generate, etc., the set of properties as outputs.

In one embodiment, the machine learning models, transformer networks, and/or crossmodal transformer networks may be trained simultaneously using the same training data. For example, the training data may be one or more sequences/sets of training images. The machine learning models, transformer networks, and/or crossmodal transformer networks may all be trained at the same time using the training data. For example, the training data may be provided to the machine learning models (e.g., neural networks, CNNs, etc.), which may generate features (e.g., visual features) which are provided to the transformer networks. The transformer networks may determine properties of the material based on the features, or may generate transformed features that are provided to the crossmodal transformer networks. Training the machine learning models, transformer networks, and/or crossmodal transformer networks of the material analysis system 110 simultaneously may also be referred to as end-to-end training.

As discussed above, the material analysis system 110 may determine a set of material properties for a material based on images of the microstructure of the material. The material analysis system 110 may be capable of determining the material properties for hundreds, thousands, etc., of material more quickly, efficiently, and/or automatically (e.g., without requiring user intervention or instructions). In one embodiment, the material analysis system 110 may allow users to select possible or candidate materials that may be used for various applications, more quickly and/or more efficiently. For example, the material analysis system 110 may be used to determine the material properties of any number of materials (e.g., hundreds, thousands, or even millions of different types of material). The material analysis system 110 may allow users to identify materials that meet threshold criterion for certain material properties. For example, the material analysis system 110 may allow users to identify materials that have a specific power above a threshold specific power. In another example, the material analysis system 100 may allow a user to select the top ten materials (from a selection of hundreds or thousands of materials) that have the ten highest specific energies. This may greatly reduce the amount of time and/or effort for users to identify appropriate materials for different applications (e.g., material to use in a battery, materials to use in strengthening a structure, etc.).

Figure 2:
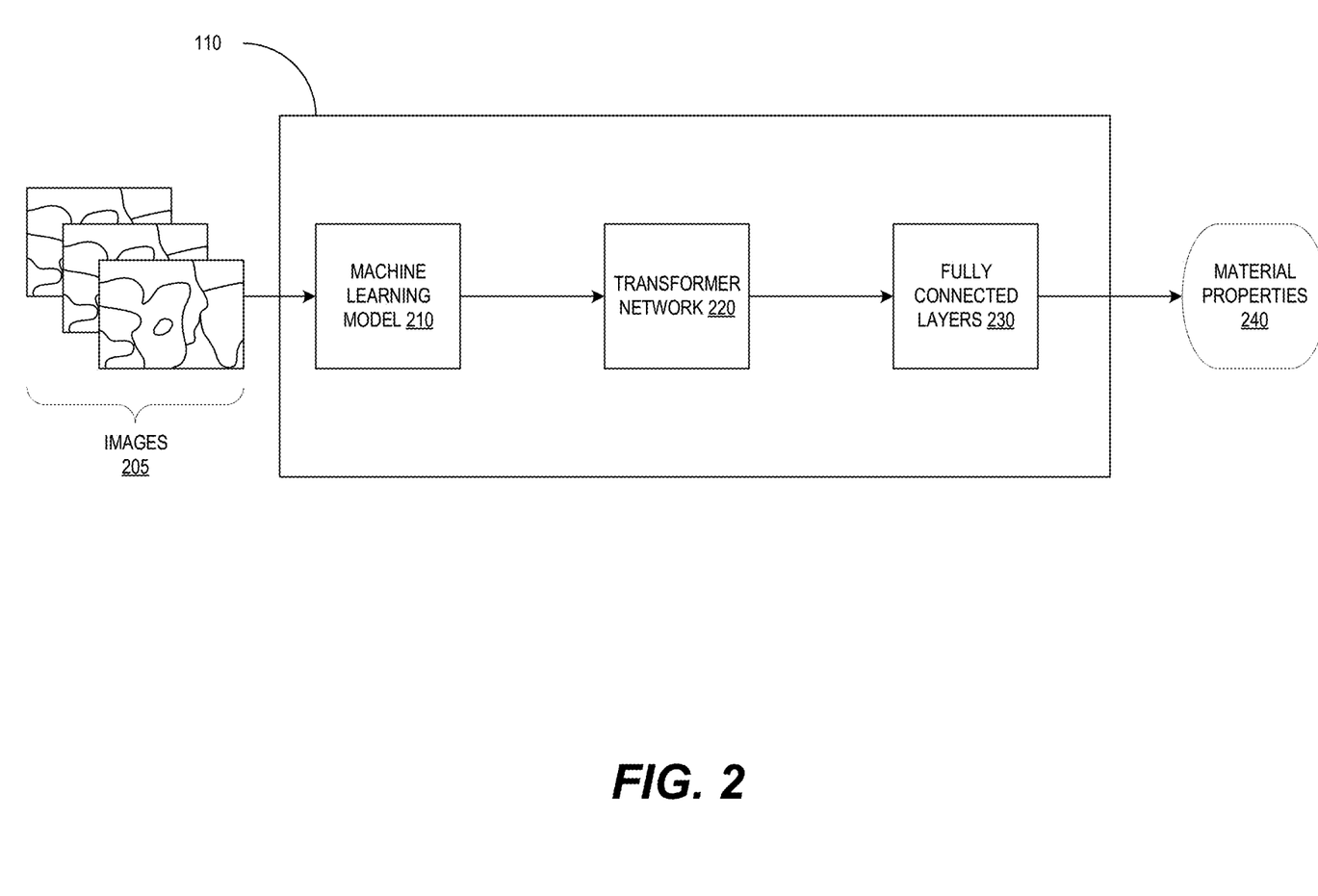
FIG. 2 is a diagram illustrating an example material analysis system, in accordance with one or more embodiments of the present disclosure.

FIG. 2 is a diagram illustrating an example material analysis system 110, in accordance with one or more embodiments of the present disclosure. The material analysis system 110 includes a machine learning model 210, a transformer network 220, and fully connected layers 230. As discussed above, the material analysis system 110 may receive, retrieve, access, obtain, etc., images 205 (e.g., a set or sequence of images). The material analysis system 110 may determine one or more material properties 240 (e.g., one or more properties of a material such as specific energy, specific power, etc.) based on the images 205.

In one embodiment, the machine learning model 210 may be a neural network. The neural network may be used to model relationships between (e.g., complex) inputs and outputs or to find patterns in data, where the dependency between the inputs and the outputs may not be easily ascertained. The neural network may also be a computing model that may be used to determine a feature in input data through various computations. For example, the neural network may determine a feature (e.g., a number, shape, pattern, etc.) in input data (e.g., images, etc.) according to a structure that defines a sequence of computations to be performed. The neural network may also generate an output (e.g., an inference, a decision, etc.) based on the input data. For example, the neural network may generate/determine a bounding box around an object in an image/video, or may generate/determine a path/trajectory for a vehicle.

In one embodiment, the machine learning model 210 may be a CNN. A CNN may use convolution and pooling operations to process inputs and generate and output, such as an inference, decision, etc. A CNN may often be used to perform image analysis and/or processing. The CNN may be a deep neural network. A deep neural network may be a neural network that includes multiple intermediate layers (e.g., multiple layers of nodes and/or weights/connections between the nodes).

A CNN may include multiple filters (e.g., filter layers) and pooling layers. The filters may also be referred to as convolutional filters. A convolutional filter may include one or more kernels (e.g., convolutional kernels). The convolutional filter may be used to perform a convolution operation on an input provided to the convolutional filter. The convolution operation may be a may refer to an operation that may merge two sets of information into an output. For example, the convolutional filter may include weights (e.g., values) that may be applied to portions of the input to generate an output. The convolutional filter may generate a feature map as an output. A pooling layer of a CNN may perform pooling operations on a feature map generated by a convolutional filter. The pooling operation may refer to down-sampling a feature map, to reduce the height and weight of the feature map, while retaining the same depth.

As discussed above, the images 205 may be a sequence of images. Certain types of neural networks, such as recurrent neural networks (RNNs) or long short-term memory (LSTM) networks may be able to process sequential data. However, these types of neural networks may have problems or issues when dealing with long sequences of data. For example, an earlier portion of the sequence of data may have a limited influence on a later portion of the sequence of data, when the sequence of data is long. Thus, there may be a high probability that the initial context (from the earlier portion) may be lost by the end of the sequence of data.

Transformer network 220 may be a different type of neural network. In one embodiment, the transformer network 220 may be able to process sequential data (e.g., a sequence of images) and may be able to pay attention to different portions of the sequential data and learn from the context of those portions of the sequential data, even when long or longer sequences of data are used.

In one embodiment, transformer network 220 may use attention when processing sequences of data (e.g., sequential data). Attention allows the transformer network 220 to determine, compute, calculate, etc., the relevance of a set of values (e.g., information) based on keys and queries. For example, attention allows the transformer network 220 to focus on relevant information from other portions of a sequence based on what the transformer network 220 is currently processing. The attention used by the transformer network 220 may be referred to as self-attention. The transformer network 220 may also use positional embedding or information. The transformer network 220 may use weights (e.g., fixed or learned weights that are set during training) which may encode information related to a specific position of an item in a sequence of data. The transformer network 220 may also use multi-head attention and positional embeddings to provide information about relationships between different features. The transformer network 220 may include both encoder and decoder layers. For example, the transformer network 220 may include a stack of N encoder layers and a stack of M decoder layers. The output of an encoder layer flows into a decoder layer, and the decoder layer also has access to the all the outputs. The decoder layer may mask the elements from the output sequence that come after a predicted element.

In one embodiment, an encoder layer may have two sublayers. The first sublayer may be a multi-head attention layer and the second sublayer may be the feed forward layer. The input to an encoding layer may be an embedding of the sequence (e.g., the sequence of data, the data sequence, etc.) itself. In another embodiment, the decoder layer may be similar to an encoder layer. However, the decoder layer may have one additional sublayer, the masked multi-head attention layer (for a total of three sublayers). The decoder layer may hide future outputs to ensure that a prediction made at a time X only depends on what is known prior to time X. The decoder layer may take, as input, the output of the encoder layer.

In one embodiment, the transformer network 220 may process data non-sequentially. For example, a sequence or set of data is processed as a whole, rather than by processing each individual item in sequence (e.g., one by one). Because the transformer network 220 can process data non-sequentially, it may be easier, simpler, etc., to parallelize the operation of the transformer network 220. This allows the transformer network 220 to process data more quickly and/or efficiently than other types of neural networks, such as RNNs or LSTMs.

As discussed above, the images 205 may be provided to the machine learning model 210 (e.g., a CNN) as an input. The images 205 may depict the structure and/or microstructure of portions of a material (e.g., portions of a 3D volume of material). For example, the images 205 may depict different cross-sections of the 3-D volume of material at different depths. The machine learning model 210 may obtain, generate, determine, etc., features (e.g., visual features) of the images 205. For example, the machine learning model 210 may generate vectors, tensors, matrices, and/or other data objects that may represent or encode the features that were identified, detected, recognized, etc., by the machine learning model 210.

The features that are obtained, determined, etc., by the machine learning model 210 may be provided to the transformer network 220 as an input. In one embodiment, the transformer network 220 may apply self-attention functions, mechanisms, operations, etc., to the features to identify, recognize, learn, etc., any dependencies between the images. For example, a feature of the microstructure of a material (e.g., a whole or cavity within the material) may be depicted across a subset of the images 205. The transformer network 220 may be able to determine that there are dependencies, associations, or relationships between the subset of the images 205. In another embodiment, the transformer network 220 may be able to generate better representations of the features in the images 205 by applying self-attention functions, mechanisms, operations, etc., to the features (e.g., visual features) generated by the machine learning model 210.

In one embodiment, the transformer network 220 may generate, determine, output, etc., a set of transformed features based on the set of features (e.g., visual features) determined or generated by the machine learning model 210 (e.g., a CNN). The transformed features may be provided to a set of fully connected layers 230. The fully connected layers 230 may include layers or level of nodes that are interconnected by edges. For example, each node at a particular layer may be connected to every node in the next layer. Each of the edges may be assigned and/or associated with a weight. The fully connected layers 230 may regress the transformed features (generated by the transformer network 220) to determine, generate, obtain, etc., the material properties 240 (e.g., one or more properties of a material, such as specific power, specific energy, etc.). In one embodiment, the set of transformed features (generated by the machine learning model 210) may represent 3D visual features detected in the images of the microstructure (e.g., 2-dimensional (2D) images). For example, the transformer network 220 is identifying, determining, etc., the visual features in the third dimension based on the visual features from 2D images. Thus, the transformer network 220 may add another dimension to the visual features (e.g., 2D visual features) obtained by machine learning model 210.

Figure 3:
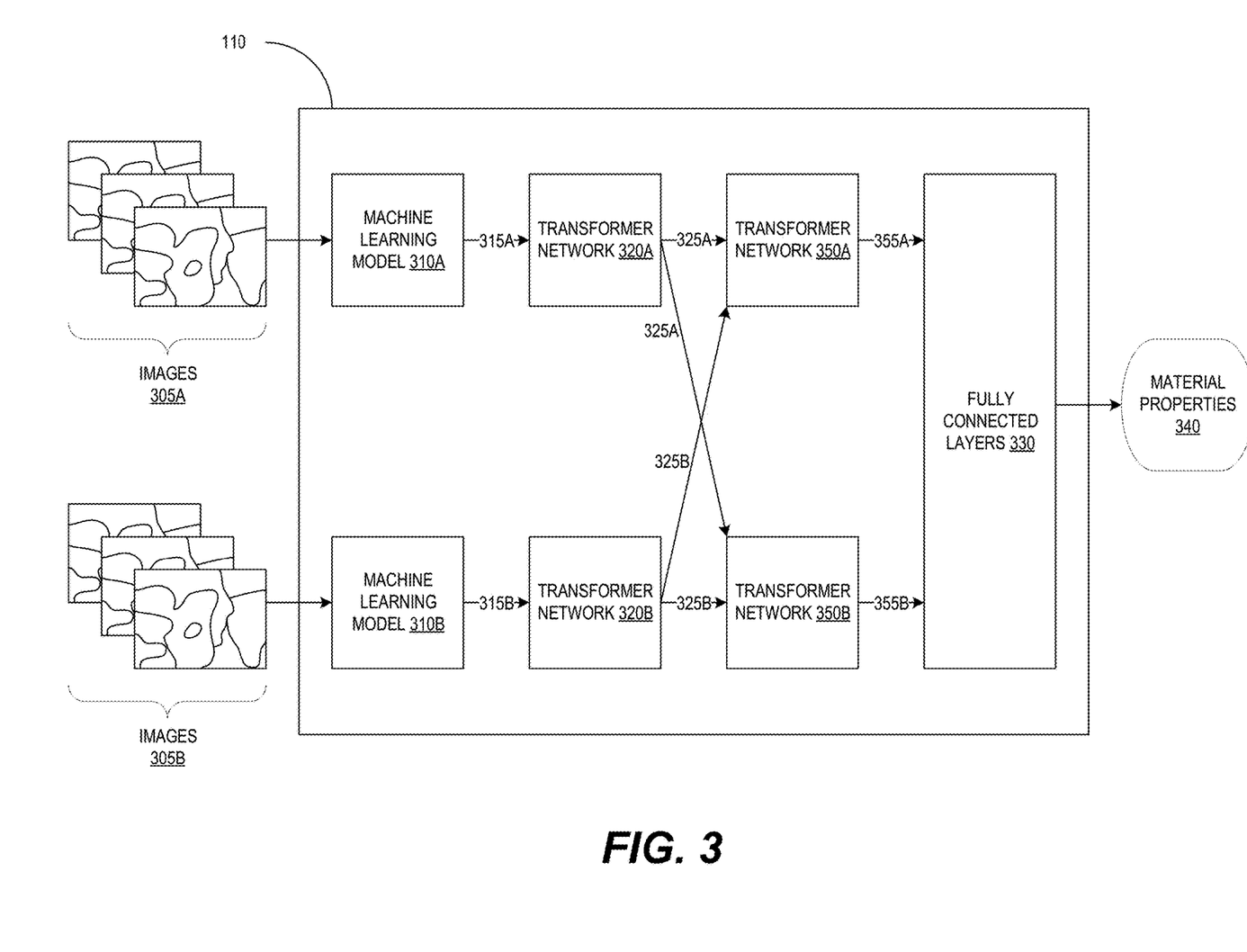
FIG. 3 is a diagram illustrating an example material analysis system, in accordance with one or more embodiments of the present disclosure.

FIG. 3 is a diagram illustrating an example material analysis system, in accordance with one or more embodiments of the present disclosure. The material analysis system 110 includes machine learning models 310A and 310B, transformer networks 320A and 320B, transformer networks 350A and 350B, and fully connected layers 330. As discussed above, the material analysis system 110 may receive, retrieve, access, obtain, etc., images 305A and 305B (e.g., a set or sequence of images). The material analysis system 110 may determine one or more material properties 340 (e.g., one or more properties of a material such as specific energy, specific power, etc.) based on the images 305A and 305B.

As discussed above, the images of a volume of material may be obtained (e.g., images may be captured from a microscope, an electron microscope, etc.). The images may depict the structure and/or microstructure of portions of a material (e.g., portions of a 3D volume of material). In one embodiment, the images of the volume of material may be divided into groups, subgroups, sets, subsets, sequences, subsequences, etc., of images. For example, the images of the volume of material may be divided into images 305A (e.g., a first subset, a first subsequence, etc.) and images 305B (e.g., a second subset, a second subsequence, etc.). The images may be divided in various different ways, methods, etc. For example, if the original set/sequence of images had N images (where N is a positive integer), the odd numbered images (e.g., 1, 3, 5, etc.) may be include in images 305A and the even numbered images (e.g., 2, 4, 6, etc.) may be include in images 305B. In another example, the original set/sequence of images may be divided into two halves, where images 305A include the first half and images 305B include the second half.

In one embodiment, machine learning models 310A and 310B may be neural networks (e.g., CNNs). Images 305A may be provided to the machine learning model 310A (e.g., a CNN) as an input and images 305B may be provided to machine learning model 310B as an input. The machine learning models 310A and 310B may obtain, generate, determine, etc., features (e.g., visual features) of the images 205. For example, the machine learning models 310A and 310B may generate vectors, tensors, matrices, and/or other data objects that may represent or encode the features that were identified, detected, recognized, etc., by the machine learning models 310A and 310B.

The features 315A that are obtained, determined, etc., by the machine learning model 310A may be provided to the transformer network 320A as an input. The features 315B that are obtained, determined, etc., by the machine learning model 310B may be provided to the transformer network 320B as an input. The transformer networks 320A and 320B may apply self-attention functions, mechanisms, operations, etc., to the features to identify, recognize, learn, etc., any dependencies between the images. The transformer networks 320A and 320B may also be able to generate better representations of the features in the images 305A and 305B by applying self-attention functions, mechanisms, operations, etc., to the features 315A and 315B (e.g., visual features) generated by machine learning models 310A and 310B, respectively.

The transformer network 320A may generate, determine, output, etc., transformed features 325A based on the set of features 315A (e.g., visual features) determined or generated by the machine learning model 310A (e.g., a CNN). The transformer network 320B may generate, determine, output, etc., transformed features 325B based on the set of features 315B (e.g., visual features) determined or generated by the machine learning model 310B (e.g., a CNN). The transformed features 325A may be provided as an input to transformer network 350A and to transformer network 350B. The transformed features 325B may be provided as an input to transformer network 350B and to the transformer network 350A.

In one embodiment, transformer network 350A may generate crossmodal attention data based on the transformed features 325A and 325B. The crossmodal attention data allows the transformer network 350A to identify, determine, and/or focus on relevant information from both the images 305A and 305B based on what the transformer network 350A is currently processing. For example, the crossmodal attention data may allow the transformer network to use information from an earlier portion of the images 305B, even though the transformer network 350A did not process images 305B. The transformer network 350A may generate crossmodal features 355A based on the crossmodal attention data. The crossmodal features 355A may be provided to the fully connected layers 330.

In one embodiment, transformer network 350B may generate crossmodal attention data based on the transformed features 325B and 325A. The crossmodal attention data allows the transformer network 350B to identify, determine, and/or focus on relevant information from both the images 305B and 305A based on what the transformer network 350B is currently processing. For example, the crossmodal attention data may allow the transformer network to use information from an earlier portion of the images 305A, even though the transformer network 350B did not process images 305A. The transformer network 350B may generate crossmodal features 355B based on the crossmodal attention data. The crossmodal features 355B may be provided to the fully connected layers 330.

In one embodiment, the transformer networks 350A and 350B may be similar to transformer networks 320A and 320B. However, transformer network 320A and 320B may include self-attention layers/modules while transformer networks 350A and 350B may use cross-attention layers/modules.

In one embodiment, the crossmodal features 355A and 355B may also represent 3D visual features detected in the images of the microstructure. However, because transformer networks 350A and 350B are using crossmodal attention data to handle different subsequences/groups of images that are processed by other transformer networks, the crossmodal features 355A and 355B may include 3D features from different transformer networks. For example, the crossmodal features 355A will include both 3D features identified, determined, etc., by transformer network 320A and 3D features determined by transformer network 320B.

In other embodiments, a separate module, component, circuit, device, etc., may generate the crossmodal attention data. For example, the separate module (not illustrated in the figures) may obtain (e.g., receive) the transformed features 325A and 325B and may generate the crossmodal attention data. The separate module may provide the crossmodal attention data to the transformer network 350A and 350B.

In one embodiment, the crossmodal features 355A and 355B (determined, generated, etc., by transformer networks 350A and 350B respectively) may be concatenated. For example, the crossmodal features 355B determined or generated by transformer network 350B may be appended to the back of the crossmodal features 355A determined or generated by transformer network 350A. The concatenated crossmodal features may be referred to as a set of combined crossmodal features.

Figure 4:
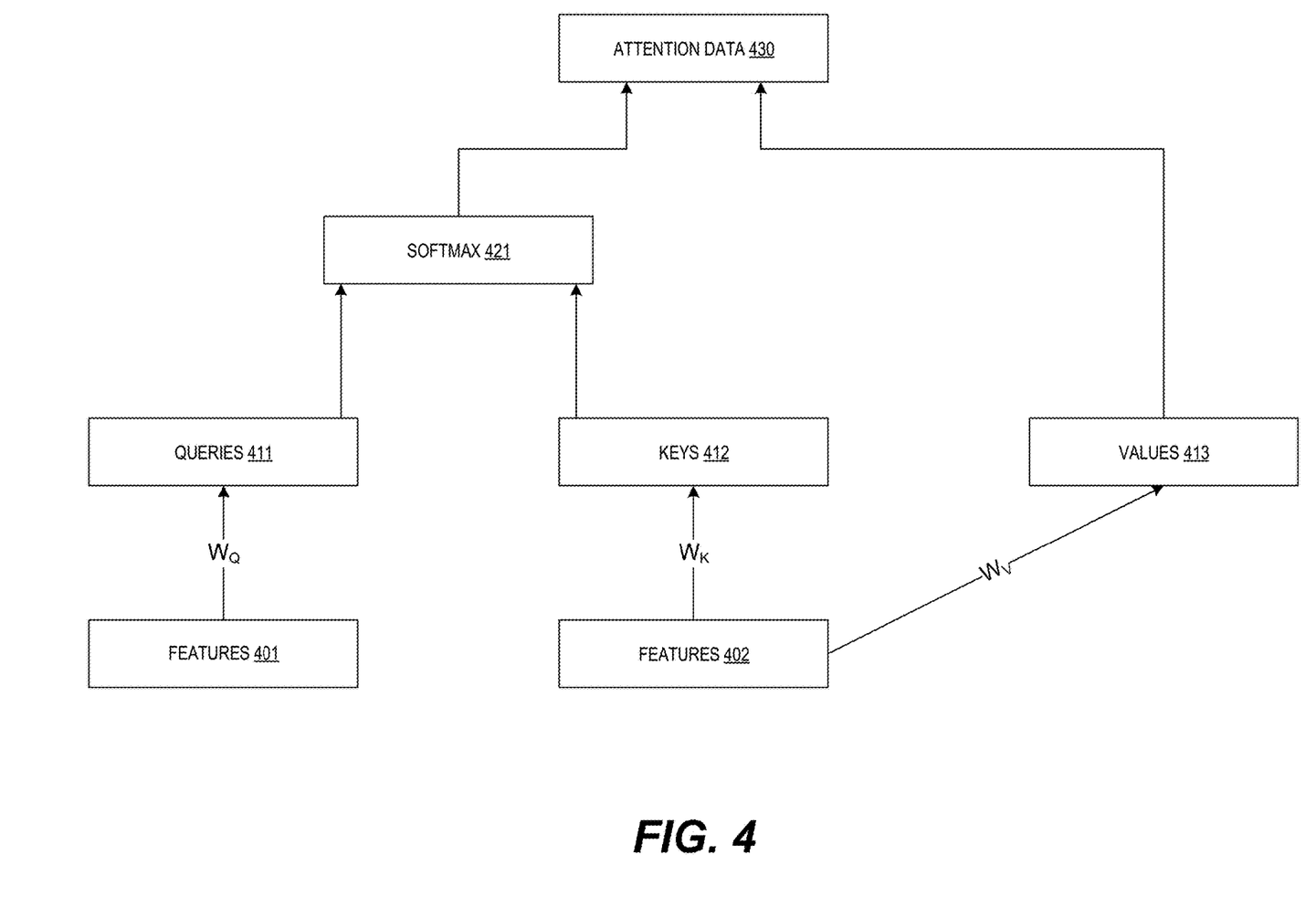
FIG. 4 is a diagram illustrating an example process for generating attention data, in accordance with one or more embodiments of the present disclosure.

The concatenated crossmodal features may be generated in a directional, pairwise manner. For example, a first set of concatenated crossmodal features may be generated using transformed features 325A first, and then the transformed feature 325B. A second set of concatenated crossmodal features may be generated using transformed features 325B first, and then the transformed feature 325A. Referring to FIG. 4, the first set of concatenated crossmodal features may be generated using transformed features 325A as features 401 and transformed features 325B may as features 402. The second set of concatenated crossmodal features may be generated using transformed features 325B as features 401 and transformed features 325A may as features 402.

In one embodiment, the concatenated crossmodal features may be provided to a set of fully connected layers 330. The fully connected layers 330 may include layers or level of nodes that are interconnected by edges. The fully connected layers 330 may regress the concatenated crossmodal features (generated by the concatenating or combining crossmodal features determined or generated by transformer networks 350A and 350B) to determine, generate, obtain, etc., the material properties 340 (e.g., one or more properties of a material, such as specific power, specific energy, etc.).

Although the present disclosure may refer to a material analysis system that divides a sequence of images into two sub-sequences and uses two series or chains of machine learning models/transformer networks, other embodiments may user a different number of sub-sequences and/or a different number of chains/series of machine learning models/transformer networks. For example, a sequence of images may be divided into 3, 7, 10, or some other appropriate number of sub-sequences. Any appropriate method or algorithm for dividing the sequence image into the subsequences may be used. Each sub-sequence may provide to a series/chain of machine learning models and/or transformer networks (e.g., each series/chain may include a CNN/machine learning model, a transformer network, and a crossmodal transformer network).

FIG. 4 is a diagram illustrating an example process for generating attention data 430, in accordance with one or more embodiments of the present disclosure. In one embodiment, the attention data 430 may be crossmodal attention data. For example, the attention data 430 may be multiple sets of attention data (e.g., transformed features 325A and 325B illustrated in FIG. 3) that are generated based on transformed features generated, obtained, determined, etc., by multiple attention networks (e.g., transformer networks 320A and 320B illustrated in FIG. 3).

As discussed above, attention data may generally be generated based on queries, keys, values, and transformed features generated by a transformer network. The queries, keys, and values may be generated using matrices that were generated, determined, obtained, etc., when the transformer network was trained. For example, the queries may be generated based on a first matrix, the keys may be generated based on a second matrix, and the values may be generated based on a third matrix.

Crossmodal attention data may be generated based on multiple sets of transformed features. As illustrated in FIG. 4, features 401 and 402 may be obtained. In one embodiment, features 401 may be a first set of transformed features determined, generated, obtained, etc., from a first transformer network (e.g., transformer network 320A illustrated in FIG. 3). Features 402 may be a first set of transformed features determined, generated, obtained, etc., from a first transformer network (e.g., transformer network 320B illustrated in FIG. 3). Features 401 may be referred to as $F_1$ and features 402 may be referred to as $F_2$.

Features 401 may be multiplied with a matrix $W_Q$ to generate the queries 411 (e.g., $F_1 W_Q$). Features 402 may be multiplied with a matrix $W_K$ to generate the keys 412 (e.g., $F_2 W_K$). Features 402 may also be multiplied with matrix $W_V$ to generate the values 413 (e.g., $F_2 W_V$). The queries 411 and keys 412 may be provided to a softmax function 421. The output of the softmax function 421 is multiplied with the values 413 to generate the attention data 430 (e.g., the crossmodal attention data).

Figure 5:
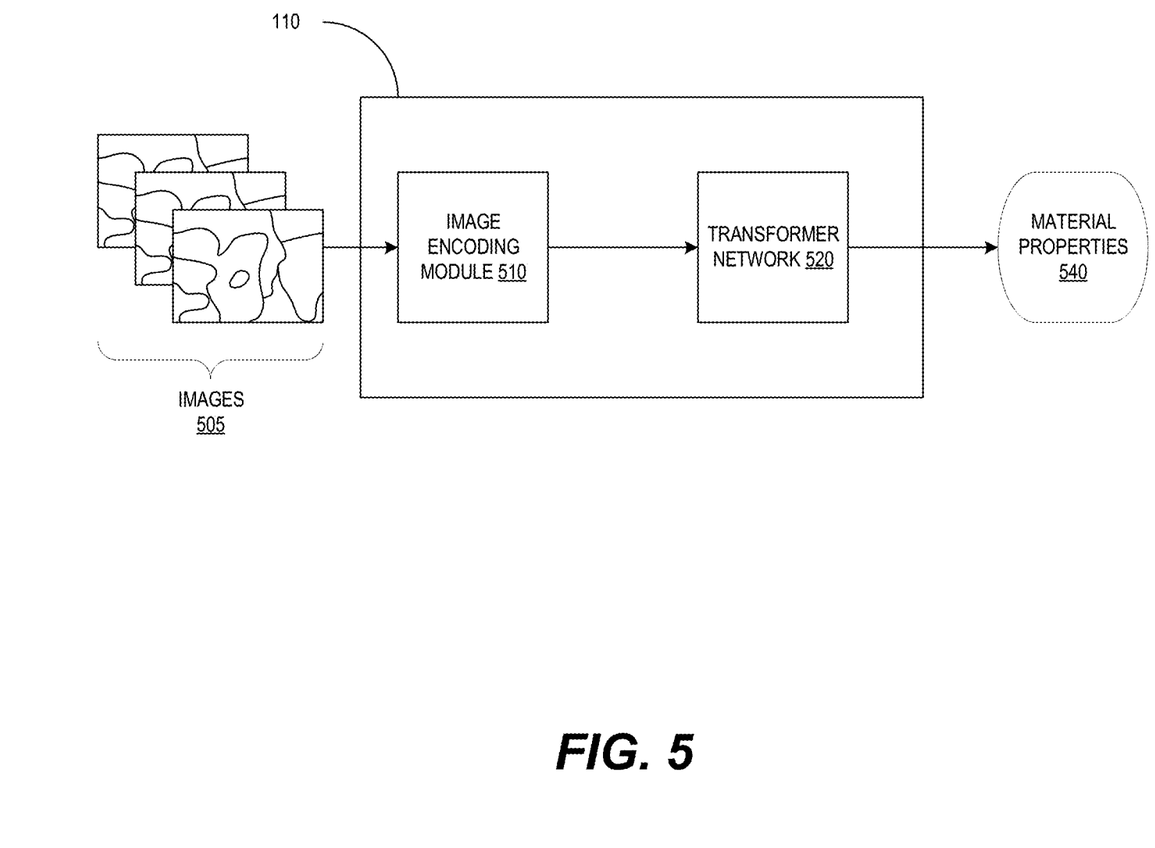
FIG. 5 is a block diagram that illustrates an example material analysis system, in accordance with one or more embodiments of the present disclosure.

FIG. 5 is a block diagram that illustrates an example material analysis system 110, in accordance with one or more embodiments of the present disclosure. The material analysis system 110 includes an image encoding module 510 and a transformer network 520. As discussed above, the material analysis system 110 may receive, retrieve, access, obtain, etc., images 505 (e.g., a set or sequence of images). The material analysis system 110 may determine one or more material properties 540 (e.g., one or more properties of a material such as specific energy, specific power, etc.) based on the images 505.

As discussed above, the images of a volume of material may be obtained and the images may depict the structure and/or microstructure of portions of a material. The images may be provided to the image encoding module 510. In one embodiment, the image encoding module 510 may process or flatten the images 505. For example, each image 505 may be divided into four, sixteen, or some other appropriate number of portions. Each of the portions of each image may be concatenated to form a vector/array of portions of the images 505. For example, if each image 505 is divided into four portions, and there are ten images, then a vector/array may be constructed as follows: [1-1, 1-2, 1-3, 1-4, 2-1, 2-2, 2-3, 2-4 . . . 10-1, 10-2, 10-3, 10-4]. As indicated above, each element in the vector/array has the form X-Y, where X is the portion number and Y is the sequence number within the sequence of set of images 505. For example, 3-2 may indicate that the element is the third portion of the second image.

In one embodiment, the image encoding module 510 may also include information about the position of the within an image 505 and/or within the sequence of images 505. For example, in addition to adding the portions of the images to the vector/array, the image encoding module 510 may include the encoding illustrated above (e.g., each element of the vector/array may also include the X-Y encoding indicating which portion of the image and which image in the sequence, along with the portion of the image).

In one embodiment, the processed or flattened images (e.g., the vector/array of the portions of the images along with the positional encoding/embedding) may be provided to the transformer network 520 and an input. The transformer network 520 may process/analyze the flattened images and may determine, generate, obtain, etc., the material properties 540.

Figure 6:
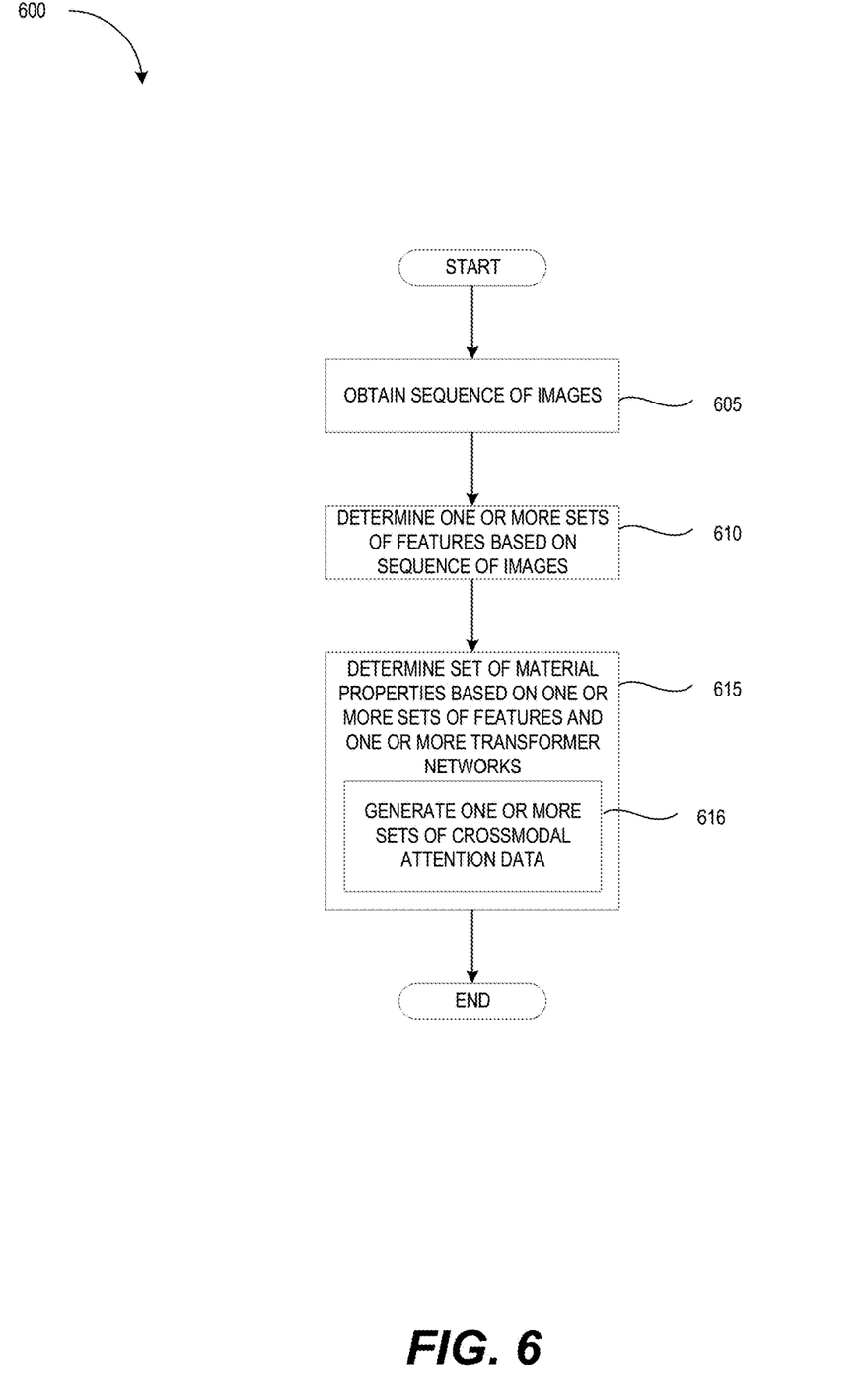
FIG. 6 is a flow diagram of a process for determining properties of a material, in accordance with one or more embodiments of the present disclosure.

FIG. 6 is a flow diagram of a process 600 for determining properties of a material, in accordance with one or more embodiments of the present disclosure. Process 600 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 600 may be performed by a material analysis system (e.g., material analysis system 110, machine learning models, transformer networks, crossmodal transformer networks, etc., illustrated in FIGS. 1-3 and 5).

The process 600 begins at block 605 where the process 600 obtains a set/sequence of images. For example, the process 600 may receive the set/sequence of images or may retrieve/access the set/sequence of images from a data storage device. At block 610, the process 600 may determine one or more sets of features (e.g., visual features) of the set/sequence of images. For example, process 600 may provide the set/sequence of images to a machine learning model (e.g., a neural network, a CNN, etc.). The machine learning model may generate, determine, obtain, etc., a set of features. In another example, process 600 may divide the set/sequence of images into multiple subsets/subsequences of images, and may provide each subset/subsequence of images to one of multiple machine learning models. Each of the machine learning models may determine a set of features.

At block 615, the process 600 may determine one or more material properties (e.g., one or more properties of a material) based on the one or more sets of features and one or more transformer networks. For example, a set of features may be provided to a transformer network as an input, and the transformer network may determine a set of material properties based on the set of features, as illustrated in FIG. 2. In another example, multiple sets of features may be provided to multiple transformer networks.

In one embodiment, the process 600 may optionally generate crossmodal attention data based on the multiple sets of features at block 616. For example, if multiple machine learning models are used to generate multiple set of features, then multiple transformer networks may be used to determine one or more material properties, as illustrated in FIG. 3. Crossmodal attention data may be generated for some of the transformer networks (e.g., crossmodal transformer networks). The transformer networks (e.g., crossmodal transformer networks) may determine, obtain, generate, etc., one or more material properties based on the crossmodal transformer data.

Figure 7:
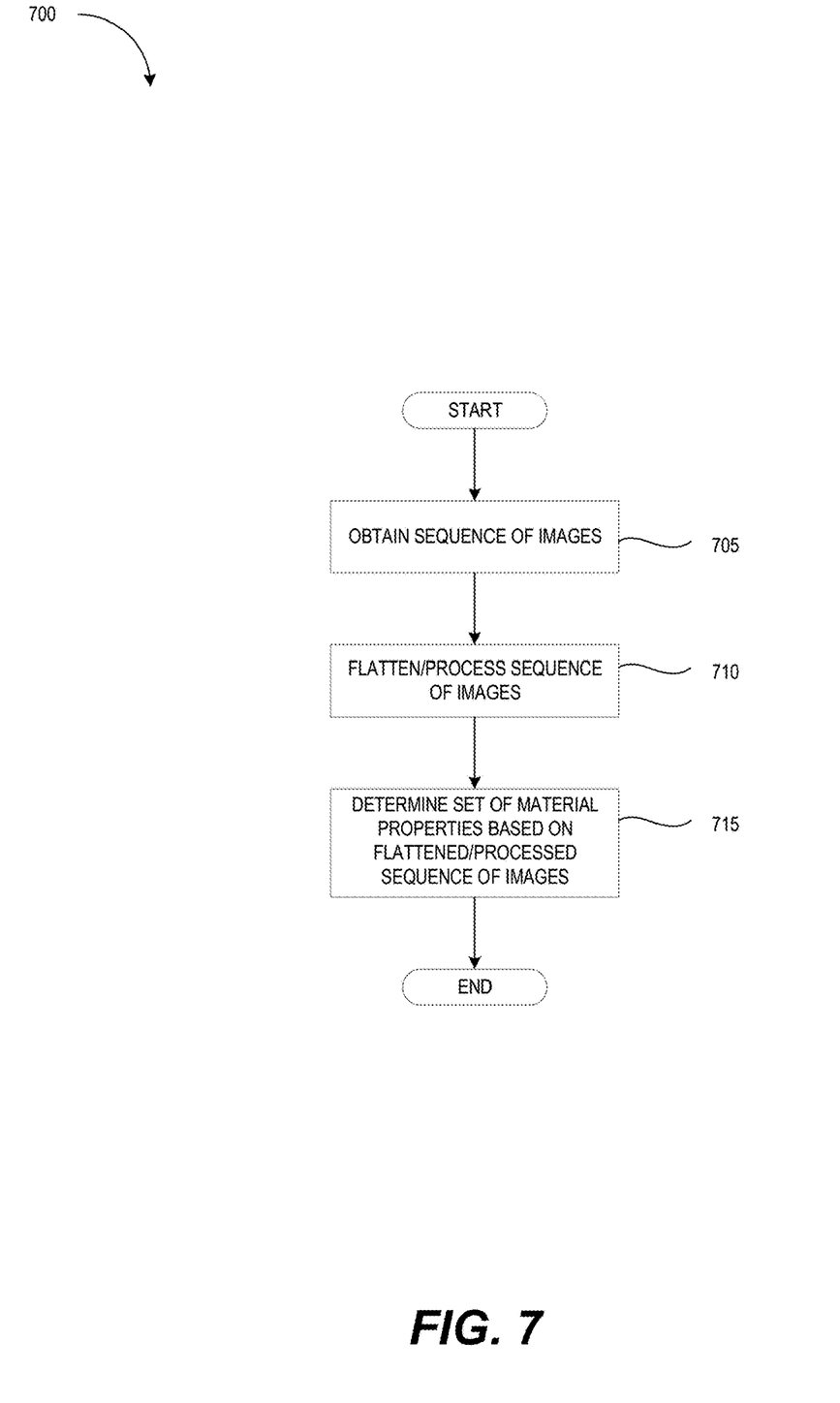
FIG. 7 is a flow diagram of a process for determining properties of a material, in accordance with one or more embodiments of the present disclosure.

FIG. 7 is a flow diagram of a process 700 for generating training data, in accordance with one or more embodiments of the present disclosure. Process 700 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 700 may be performed by a vehicle, components/systems of the vehicle (e.g., material analysis system 110, machine learning models, transformer networks, crossmodal transformer networks, etc., illustrated in FIGS. 1-3 and 5).

The process 700 begins at block 705 where the process 700 The process 600 begins at block 705 where the process 700 obtains a set/sequence of images. For example, the process 700 may receive the set/sequence of images or may retrieve/access the set/sequence of images from a data storage device. At block 710, the process 700 may process or flatten the images. For example, process 700 may divide each image into portions and may concatenate/combine all of the portions of the images into a vector/array (as discussed above). At block 715 the process 700 may determine, generate, obtain, etc., one or more material properties based on the processed/flattened images. For example, the vector/array of image may be provided to a transformer network as an input and the transformer network may determine the one or more material properties based on the processed/flattened images.

Figure 8:
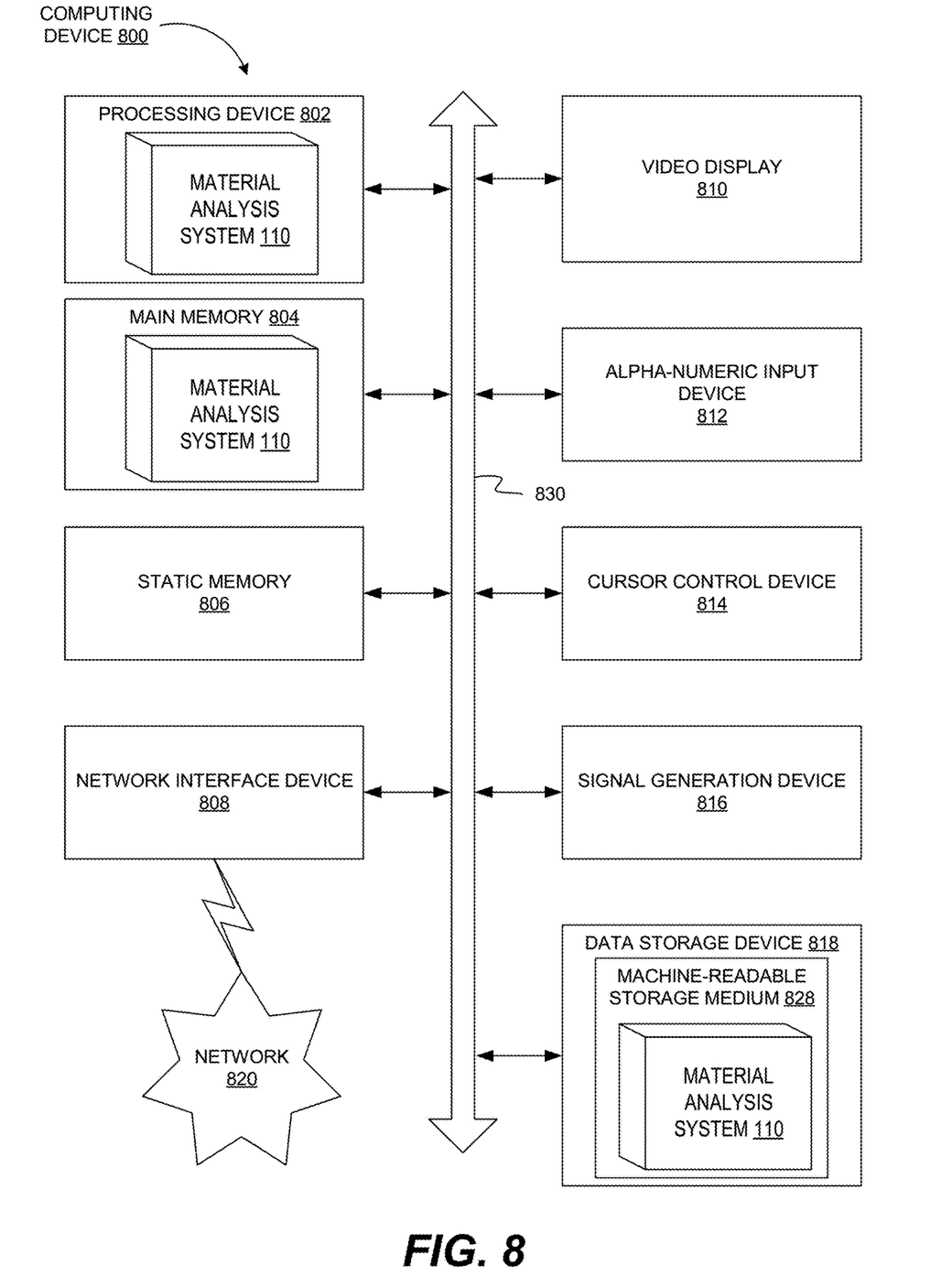
FIG. 8 is a block diagram of an example computing device that may perform one or more of the operations described herein, in accordance with some embodiments of the present disclosure.

FIG. 8 is a block diagram of an example computing device 800 that may perform one or more of the operations described herein, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions, e.g., instructions for carrying out the operations described herein, in accordance with one or more aspects of the present disclosure. Instructions 826 implementing the different systems described herein (e.g., the material analysis system 110, machine learning models, transformer networks, crossmodal transformer networks, etc., illustrated in FIGS. 1-3 and 5) may also reside, completely or at least partially, within main memory 804 and/or within processing device 802 during execution thereof by computing device 800, main memory 804 and processing device 802 also constituting computer-readable media. The instructions may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "generating," "determining," "training," "obtaining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

When an action, function, operation, etc., is described herein as being performed automatically, this may indicate that the action, function, operation, etc., may be performed without requiring human or user input, invocation, or interaction.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   obtaining a sequence of images of a three-dimensional volume of a material;
   determining a set of features based on the sequence of images and a first neural network, wherein the set of features indicate microstructure features of the material; and
   determining a set of material properties of the three-dimensional volume of the material based on the set of features a first transformer network, a second transformer network, a first crossmodal transformer network, and a second crossmodal transformer network, wherein a first set of transformed features from the first transformer network are provided as input to the first crossmodal transform network and the second crossmodal transform network, and wherein a second set of transformed features from the second transformer network are provided as input to the first crossmodal transform network and the second crossmodal transformer network.

2. The method of claim 1, wherein:
   the set of features are determined further based on a second neural network;
   the sequence of images is divided into a first sub-sequence of images and a second sub-sequence of images; and
   the first sub-sequence of images is provided to the first neural network and the second sub-sequence of images is provided to the second neural network.

3. The method of claim 1, wherein:
   a first subset of the set of features is provided to the first transformer network;
   a second subset of the set of features is provided to the second transformer network;
   the first transformer network generates the first set of transformed features; and
   the second transformer network generates the second set of transformed features.

4. The method of claim 3, further comprising:
   generating a first set of crossmodal attention data and a second set of crossmodal attention data, based on the first set of transformed features and the second set of transformed features.

5. The method of claim 1, wherein the first neural network and the first transformer network are trained simultaneously using a same training data.

6. The method of claim 1, wherein the set of material properties comprises one or more of a specific power of the material and a specific energy of the material.

7. The method of claim 1, wherein each image of the sequence of images depicts a cross section of the material at a respective depth of the three-dimensional volume of the material.

8. The method of claim 1, wherein the first neural network comprises a convolutional neural network.

9. A apparatus, comprising:
   a memory configured to store data; and
   a processing device coupled to the memory, the processing device configured to:
      obtain a sequence of images of a three-dimensional volume of a material;
      determine a set of features based on the sequence of images and a first neural network, wherein the set of features indicate microstructure features of the material; and
      determine a set of material properties of the three-dimensional volume of the material based on the set of features, a first transformer network, a second transformer network, a first crossmodal transformer network, and a second crossmodal transformer network, wherein a first set of transformed features from the first transformer network are provided as input to the first crossmodal transform network and the second crossmodal transformer network, and wherein a second set of transformed features from the second transformer network are provided as input to the first crossmodal transform network and the second crossmodal transformer network.

10. The apparatus of claim 9, wherein:
    the set of features are determined further based on a second neural network;
    the sequence of images is divided into a first sub-sequence of images and a second sub-sequence of images; and
    the first sub-sequence of images is provided to the first neural network and the second sub-sequence of images is provided to the second neural network.

11. The apparatus of claim 9, wherein:
    a first subset of the set of features is provided to the first transformer network;

a second subset of the set of features is provided to the second transformer network;
the first transformer network generates the first set of transformed features; and
the second transformer network generates the second set of transformed features.

12. The apparatus of claim 11, wherein the processing device is further configured to:
generate a first set of crossmodal attention data and a second set of crossmodal attention data, based on the first set of transformed features and the second set of transformed features.

13. The apparatus of claim 9, wherein the first neural network and the first transformer network are trained simultaneously using a same training data.

14. The apparatus of claim 9, wherein the set of material properties comprises one or more of a specific power of the material and a specific energy of the material.

15. The apparatus of claim 9, wherein each image of the sequence of images depicts a cross section of the material at a respective depth of the three-dimensional volume of the material.

16. The apparatus of claim 9, wherein the first neural network comprises a convolutional neural network.

17. A non-transitory computer-readable storage medium including instructions that, when executed by a processing device, cause the processing device to perform operations comprising:

obtaining a sequence of images of a three-dimensional volume of a material;
determining a set of features based on the sequence of images and a first neural network, wherein the set of features indicate microstructure features of the material; and
determining a set of material properties of the three-dimensional volume of the material based on the set of features, a first transformer network, a second transformer network, a first crossmodal transformer network, and a second crossmodal transformer network, wherein a first set of transformed features from the first transformer network are provided as input to the first crossmodal transform network and the second crossmodal transformer network, and wherein a second set of transformed features from the second transformer network are provided as input to the first crossmodal transform network and the second crossmodal transformer network.

18. The non-transitory computer-readable storage medium of claim 17, wherein:
the set of features are determined further based on a second neural network;
the sequence of images is divided into a first sub-sequence of images and a second sub-sequence of images; and
the first sub-sequence of images is provided to the first neural network and the second sub-sequence of images is provided to the second neural network.

* * * * *